United States Patent
Ono et al.

(10) Patent No.: US 10,712,451 B2
(45) Date of Patent: Jul. 14, 2020

(54) ANOMALY DETECTOR FOR SELF-LOCATION ESTIMATION DEVICE AND VEHICLE

(71) Applicant: HITACHI CONSTRUCTION MACHINERY CO., LTD., Tokyo (JP)

(72) Inventors: Yukihiko Ono, Tokyo (JP); Hidefumi Ishimoto, Tsuchiura (JP); Wataru Tanaka, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 271 days.

(21) Appl. No.: 15/770,363

(22) PCT Filed: Sep. 7, 2016

(86) PCT No.: PCT/JP2016/076353
§ 371 (c)(1),
(2) Date: Apr. 23, 2018

(87) PCT Pub. No.: WO2017/085989
PCT Pub. Date: May 26, 2017

(65) Prior Publication Data
US 2018/0284292 A1 Oct. 4, 2018

(30) Foreign Application Priority Data
Nov. 19, 2015 (JP) ................................. 2015-226659

(51) Int. Cl.
*G01S 19/48* (2010.01)
*G01S 19/22* (2010.01)
(Continued)

(52) U.S. Cl.
CPC .............. *G01S 19/48* (2013.01); *G01S 7/497* (2013.01); *G01S 17/42* (2013.01); *G01S 17/87* (2013.01);
(Continued)

(58) Field of Classification Search
CPC combination set(s) only.
See application file for complete search history.

(56) References Cited

U.S. PATENT DOCUMENTS 6,751,535 B2    6/2004   Mori
9,372,253 B2 *  6/2016   Nakata .................. G01S 5/0252
(Continued)

FOREIGN PATENT DOCUMENTS

| JP | 11-258339 A | 9/1999 |
| JP | 2000-172337 A | 6/2000 |
| JP | 2015-75826 A | 4/2015 |

OTHER PUBLICATIONS

International Search Report of PCT/JP2016/076353 dated Nov. 8, 2016.

*Primary Examiner* — Mamadou L Diallo
(74) *Attorney, Agent, or Firm* — Mattingly & Malur, PC

(57) ABSTRACT

A first measuring device measures a location of its own vehicle relative to each feature point on a surrounding structure around a road surface on which the vehicle. A first feature-point is provided which, based on output from the first measuring device, acquires coordinates of the each feature point expressed in a coordinate system of the first measuring device, and uses a self-location to convert the coordinates into an external coordinate. A feature-point trajectory generation section is provided to generate, based on the first coordinates, a trajectory of the feature point group. A second measuring device measures a location of its own vehicle relative to a feature point located rearward of the feature point measured by the first measuring device. An anomaly determination section is provided to determine that anomaly occurs in a self-location estimation device if the second coordinates are on the trajectory.

7 Claims, 10 Drawing Sheets

(51) Int. Cl.
*G01S 19/50* (2010.01)
*G05D 1/02* (2020.01)
*G01S 17/42* (2006.01)
*G01S 17/875* (2020.01)
*G01S 17/89* (2020.01)
*G01S 17/87* (2020.01)
*G01S 7/497* (2006.01)
*G01S 17/931* (2020.01)
*G01S 19/49* (2010.01)

(52) U.S. Cl.
CPC ............ *G01S 17/875* (2013.01); *G01S 17/89* (2013.01); *G01S 17/931* (2020.01); *G01S 19/22* (2013.01); *G01S 19/50* (2013.01); *G05D 1/02* (2013.01); *G05D 1/0212* (2013.01); *G01S 19/49* (2013.01); *G05D 2201/021* (2013.01)

(56) References Cited

U.S. PATENT DOCUMENTS

| | | | | |
|---|---|---|---|---|
| 2015/0125040 | A1* | 5/2015 | Nakayama | G06T 7/248 382/104 |
| 2016/0373473 | A1* | 12/2016 | Truong | H04W 4/029 |
| 2017/0124405 | A1* | 5/2017 | Gupta | G06K 9/6202 |
| 2017/0336515 | A1* | 11/2017 | Hosoya | G01S 19/40 |
| 2018/0024562 | A1* | 1/2018 | Bellaiche | G01S 19/48 701/26 |

* cited by examiner (a)

(b)

(a)

(b)

CASE1 (SELF-LOCATION ESTIMATION DEVICE IS NORMAL)

CASE2 (SELF-LOCATION ESTIMATION DEVICE IS NORMAL)

CASE3 (SELF-LOCATION ESTIMATION DEVICE IS ABNORMAL)

ANOMALY DETECTOR FOR SELF-LOCATION ESTIMATION DEVICE AND VEHICLE

TECHNICAL FIELD

The present invention relates to a technique to detect anomaly in a self-location estimation device installed in a vehicle.

BACKGROUND ART

Due to interference factors such as multipath or the like, an error may occur in a self-location using a GPS (Global Positioning System) signal. To address this, as an example of techniques for detection of anomaly occurring in the self-location estimation processing, Patent Literature 1 discloses "A travel controlling apparatus of an unmanned vehicle comprising: a GPS receiver receiving a GPS signal so as to determine a vehicle position; an autonomous navigation computing device to position a position and azimuth of the vehicle on the basis of a traveling direction and a traveling distance of the vehicle; a position measuring portion calculating a present position and azimuth of the vehicle on the basis of the respective measured results of the GPS receiver and the autonomous navigation computing device; and a travel controlling portion controlling the vehicle travel on the basis of the comparison result between a previously set traveling path with the calculated present position and azimuth, wherein a shoulder zone distance measuring device is provided for measuring a distance from the vehicle to a shoulder zone provided in a side of the traveling path, and the position measuring portion compensates at least one of a position positioned by the GPS receiver and a position and an azimuth positioned by the autonomous navigation computing device on the basis of the shoulder zone distance measured by the shoulder zone distance measuring device so as to determine the present position and azimuth (brief excerpts)" and "a terrain information along the traveling path is input from a control governing portion so as to determine a data abnormality on the basis of a difference information between the input terrain information and the positioning data from the shoulder zone distance measuring device (excerpts from paragraph 0021 in the specification of Patent Literature 1)".

CITATION LIST

Patent Literature

PATENT LITERATURE 1: Excerpts from specification of U.S. Pat. No. 6,751,535

SUMMARY OF INVENTION

Technical Problem

In Patent Literature 1, the terrain information along the traveling path is used to detect anomaly in GPS positioning data. Because of this, the terrain information is required to be beforehand obtained and recorded. Therefore, there is a problem that, in the travelling in an area of which terrain geometries are not known, an anomaly in the GPS positioning data is incapable of being detected in the invention disclosed in Patent Literature 1. In particular, in a mine, the terrain is prone to be varied due to working face, collapse of a mound forming a shoulder, or the like. To address this, in mining dump trucks, a high need exists for a technique to detect anomaly in the self-location estimation processing with a high ability to trace terrain changes.

The present invention has been made in view of the above problems and it is an object of the present invention to provide a technique to detect anomaly in a self-location estimation device installed in a vehicle without terrain information beforehand obtained.

Solution to Problem

To solve the above problems, for example, the configuration disclosed in the claims may be adopted. The present application includes numerous aspects for solution to the above problems, and the following is an example of them. In an anomaly detector for a self-location estimation device that is installed in a vehicle and estimates a self-location defined by an absolute coordinate system, a first feature-point coordinate calculation section is provided. Based on output from a first measuring device that measures a location of its own vehicle relative to each feature point in a feature point group on a surrounding structure around a road surface on which the vehicle travels, the feature point group being lined along a travel direction, the first feature-point coordinate calculation section acquires coordinates of the each feature point expressed in a coordinate system of the first measuring device, and uses the self-location to convert the coordinates into an external coordinate system in order to calculate first coordinates. A feature-point trajectory generation section is provided, which generates, based on the first coordinates, a trajectory defined by the external coordinate system of the feature point group. A second feature-point coordinate calculation section is provided. Based on output from a second measuring device that measures a location of its own vehicle relative to a feature point in the feature point group of the surrounding structure, the feature point being located, in the travel direction, rearward of the feature point measured by the first measuring device, at a measurement time of the first measuring device, the second feature-point coordinate calculation section acquires coordinates of the feature point located rearward in the travel direction, the coordinates being expressed in a coordinate system of the second measuring device, and uses the self-location to convert the coordinates into an external coordinate system in order to calculate second coordinates. An anomaly determination section is provided which determines that anomaly occurs in the self-location estimation device if a deviation between the second coordinates and the trajectory of the feature point group defined by the external coordinate system exceeds a threshold established to deem that the second coordinates are on the trajectory.

Advantageous Effects of Invention

The present invention can provide a technique to detect anomaly in a self-location estimation device installed in a vehicle without terrain information beforehand obtained. These and other issues, configurations and advantages will be apparent from a reading of the following description of embodiments.

BRIEF DESCRIPTION OF DRAWINGS

FIG. 4 shows explanatory diagrams illustrating the travel environment of the dump truck and example detection of feature points of a surrounding structure, in which (a) illustrates the travel environment and (b) illustrates example processing to detect a feature point from the output from the front lidar 2a.

DESCRIPTION OF EMBODIMENTS

Figure 1:
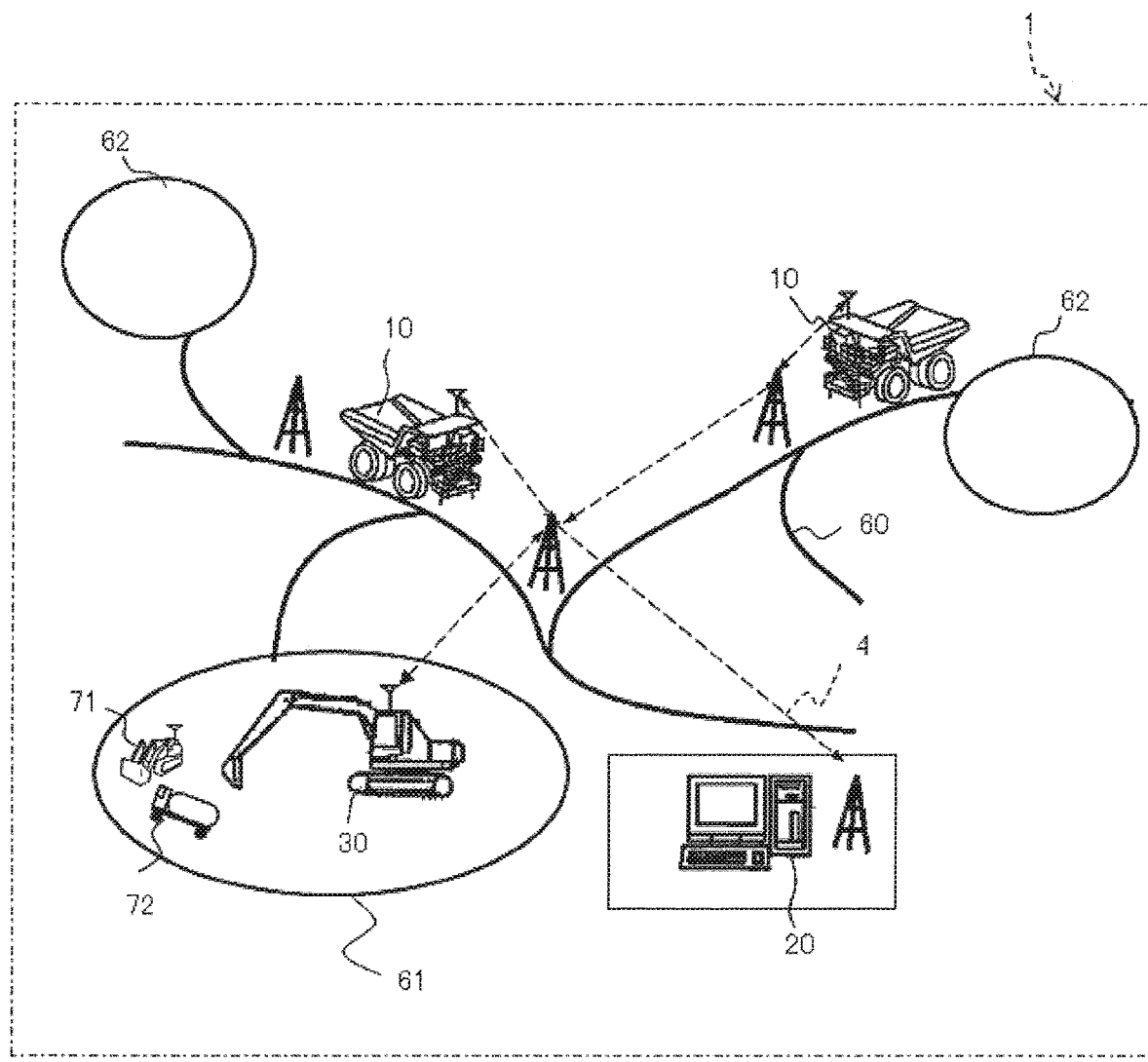
FIG. 1 is a schematic configuration diagram of an autonomous travel system for working machines used in a mine where a dump truck equipped with an anomaly detector according to the embodiment is operated.

Embodiments of the present invention will now be described with reference to the accompanying drawings. FIG. 1 is a schematic configuration diagram of an autonomous travel system for working machines for a mine where a dump truck equipped with an anomaly detector according to the embodiments is operated.

First Embodiment

An autonomous travel system 1 illustrated in FIG. 1 is configured to include a communication connection over a wireless communication network 4 between a dump truck 10 illustrated as an example of mine working machines autonomously traveling and an operation control server 20 installed in an operation control center either close to or away from a quarry. A mine includes: loading sites 61 in which an excavator 30 performs excavation work and then loads excavated earth and ores onto the dump truck 10; dumping sites 62 in which the dump truck 10 dumps the burden it has hauled; and haul road 60 connecting the loading sites 61 with the dumping sites 62. The dump truck 10 receives operation control information from the operation control server 20 over the wireless communication network 4, and autonomously travels at a predetermined traveling speed on the haul road 60 in compliance with the operation control information.

Although one example described in the following description is that an anomaly detector according to the present invention is installed in the dump truck 10 and anomaly detection is performed using a shoulder as a structure surrounding the haul road 60, an example vehicle and an example surrounding structure are not limited to the dump truck and the shoulder. In the present embodiment, as long as the vehicle is any mining-application working machine equipped with a self-location estimation device that estimates a self-location based on an external coordinate system using GPS positioning data or inertial data from an IMU (Inertial Measurement Unit) or the like, a type thereof is not an issue. For example, the present invention may be applied to a working machine equipped with a GPS receiver to receive self-location information, such as the excavator 30, a dozer 71 and a water-sprinkler truck 72. In this case, in the loading site 61, working face or steep slope which exist around the loading site 61 may be used as surrounding structures.

Further, the present invention may be applied to a passenger vehicle traveling on an ordinary road, such as a public roadway, a private road and the like, as well as to a mining-application working machine. In this case, guardrails along a road and buildings beside a road may be used as surrounding structures. Also, in a tunnel, the side walls in the tunnel may be used as surrounding structures.

Figure 2:
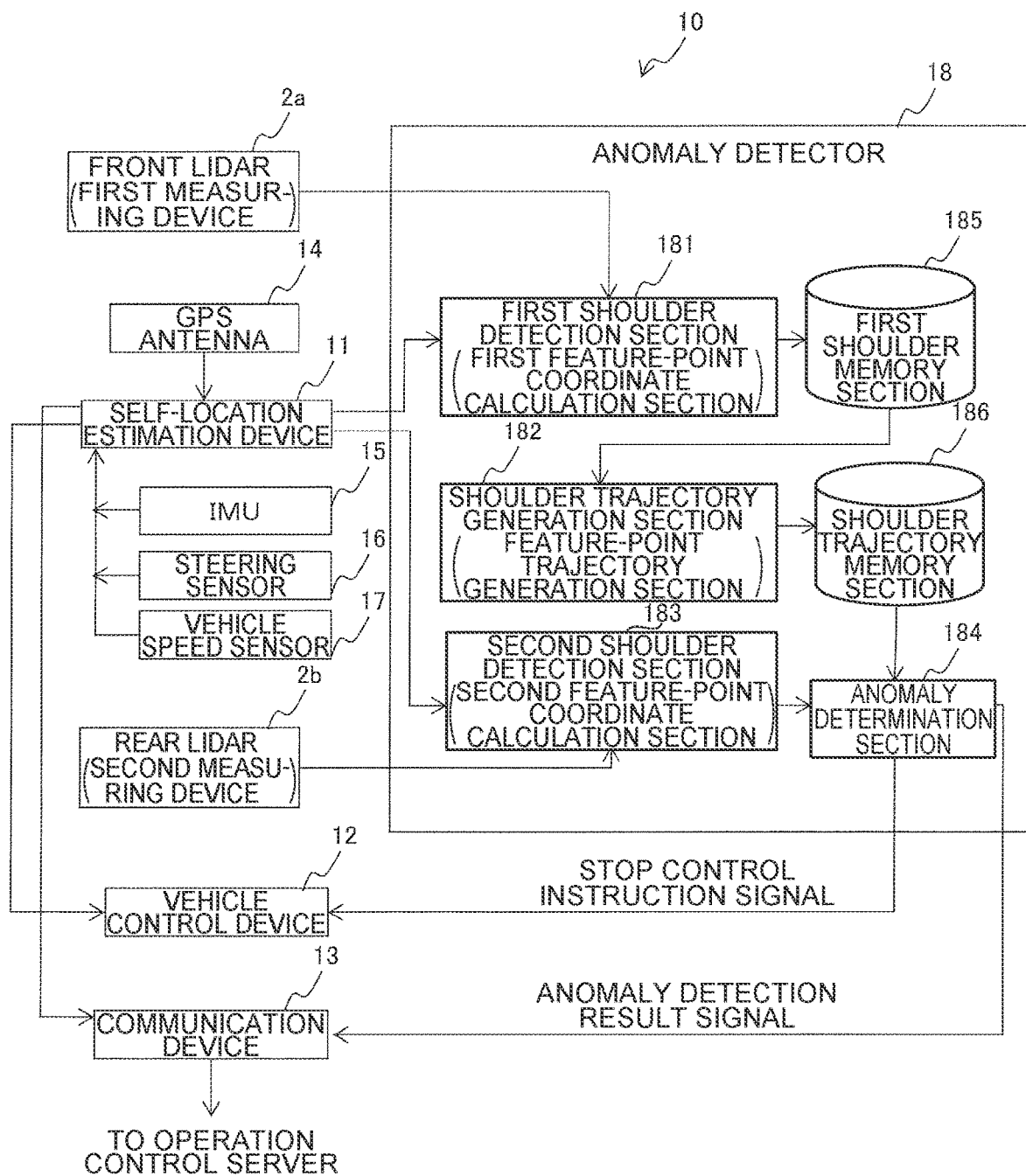
FIG. 2 is a block diagram illustrating the configuration of a dump truck.
Figure 3:
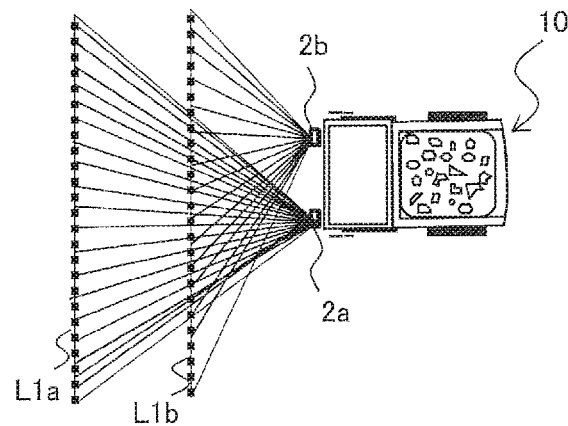
FIG. 3 shows schematic top views illustrating installation positions of a front lidar 2a and a rear lidar 2b, in which (a) illustrates the state of the front lidar 2a and the rear lidar 2b both being installed in the front of a dump truck, and (b) illustrates the state of the front lidar 2a being installed in the front of a dump truck and the rear lidar 2b being installed at the rear of the dump truck.
Figure 3:
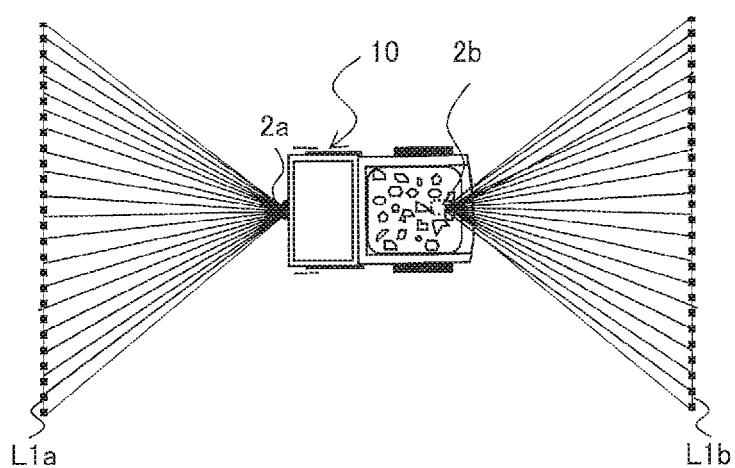

FIG. 2 is a block diagram illustrating the configuration of the dump truck 10. FIG. 3 shows schematic top views illustrating installation positions of a front lidar 2a and a rear lidar 2b, in which (a) illustrates the state of the front lidar 2a and the rear lidar 2b both being installed in the front of the dump truck 10, and (b) illustrates the state of the front lidar 2a being installed in the front of the dump truck 10 and the rear lidar 2b being installed at the rear of the dump truck 10.

The dump truck 10 includes: a self-location estimation device that estimates a self-location based on an external coordinate system (global coordinate system); a vehicle control device 12 that uses the estimated self-location to output a control instruction to a vehicle drive device for autonomous travel of the dump truck 10; and a communication device 13 for communication between the dump truck 10 and the operation control server 20.

The self-location estimation device 11 calculates a self-location in the external coordinate system (global coordinate system) on the basis of GPS positioning data received through a GPS antenna 14. The self-location estimation device 11 performs higher-accuracy self-location estimation processing by means of correction of GPS-derived self-location information by use of three: output from an IMU 15, output from a steering angle sensor 16 that senses an inclination of a front wheel axle (steering angle), and output from a vehicle speed sensor 17 that senses a vehicle speed based on the rotational speed of wheels (driven wheels) of the dump truck 10. The self-location information is output to the vehicle control device 12 to be used for autonomous travel control, or is output to the communication device 13 to be transmitted to the operation control server 20. In the operation control server 20, the received self-location information is used for traffic control processing.

The dump truck 10 further includes two lidars as sensors that detect a relative position between the dump truck 10 and the surrounding structure along a travel route of the dump truck 10. In the example in FIG. 3(a), a front Lidar 2a (corresponding to a first measuring device) for detection in an area ahead of the dump truck 10 in the travel direction is installed on the front left side. An intersection line L1a (corresponding to a first road-surface scanning line) is between a road surface A and a straight line connected by measure points on the road surface A at which laser light emitted from the front Lidar 2a arrives, that is, a scanning surface of the front lidar 2a.

A rear lidar 2b (corresponding to a second measuring device) is installed on the front right side of the dump truck 10. An intersection line L1b (corresponding to a second road-surface scanning line) is between the road surface A and a straight line connected by measure points on the road surface A at which laser light emitted from the rear lidar 2*b* arrives, that is, a scanning surface of the rear lidar 2*b*. The front lidar 2*a* and the rear lidar 2*b* are installed to the dump truck 10 at installation angles and positions such that the intersection lines L1*a*, L2*b* are parallel to each other.

Each of the front lidar 2*a* and the rear lidar 2*b* performs scans along the measurement points on the road surface A while the emission direction of the laser light is being changed gradually by a predetermined angle, e.g., 0.25 degrees. So that in the scanning surface of each of the front lidar 2*a* and the rear lidar 2*b*, a distance to the road surface A at each predetermined angle is measured. Each of the front lidar 2*a* and the rear lidar 2*b* has, for example, 0.25 degree resolution, and resolution between measurement points at a point 30 m away is one meter.

Alternatively, as illustrated in FIG. 3(*b*), the front lidar 2*a* may be installed on the front of the dump truck 10, while the rear lidar 2*b* may be installed at the rear of the dump truck 10. And, the front lidar 2*a* may be mounted at a mounting angle to the dump truck 10 such that the scanning surface of the front lidar 2*a* faces forward, while the rear lidar 2*b* may be mounted at a mounting angle to the dump truck 10 such that the scanning surface of the rear lidar 2*b* faces rearward. In this manner, the installation positions of the front lidar 2*a* and the rear lidar 2*b* have only to be determined so that the scanning surfaces of the two lidars are at a distance from each other in the front-rear direction of the travel direction of the dump truck 10, and the installation positions are not limited to the examples in FIG. 3.

The vehicle control device 12 outputs a control instruction signal to the vehicle drive device including, for example, a braking device, a drive torque limiter for limiting a rotation torque instruction value for the drive wheels, and a steering control device that changes the steering angle of the dump truck 10 (all of which are not shown).

The dump truck 10 further includes an anomaly detector 18 that detects whether or not anomaly occurs in a self-location calculated using the outputs from the front lidar 2*a* and the rear lidar 2*b* by the self-location estimation device 11.

The anomaly detector 18 is configured in collaboration between hardware and software, in which the hardware includes: a computing and control device such as a CPU (Central Processing Unit) or the like; a storage device such as HDD (Hard Disk Drive) and ROM (Read Only Memory) storing a program executed by the anomaly detector 18, or the like; and RAM (Random Access Memory) serving as a workspace when the CPU executes the program, and the software implements various functions of a first shoulder detection section 181, a shoulder trajectory generation section 182, a second shoulder detection section 183 and an anomaly determination section 184. Further, portion of the areas of the storage device of the anomaly detector 18 includes: a first shoulder memory section 185 storing shoulder point information defined by the external coordinate system detected by the first shoulder detection section 181; and a shoulder trajectory memory section 186 storing shoulder trajectory information generated by the shoulder trajectory generation section 182. The processing executed by each of the first shoulder detection section 181, the shoulder trajectory generation section 182, the second shoulder detection section 183 and the anomaly determination section 184 will described later in detail.

Figure 4:
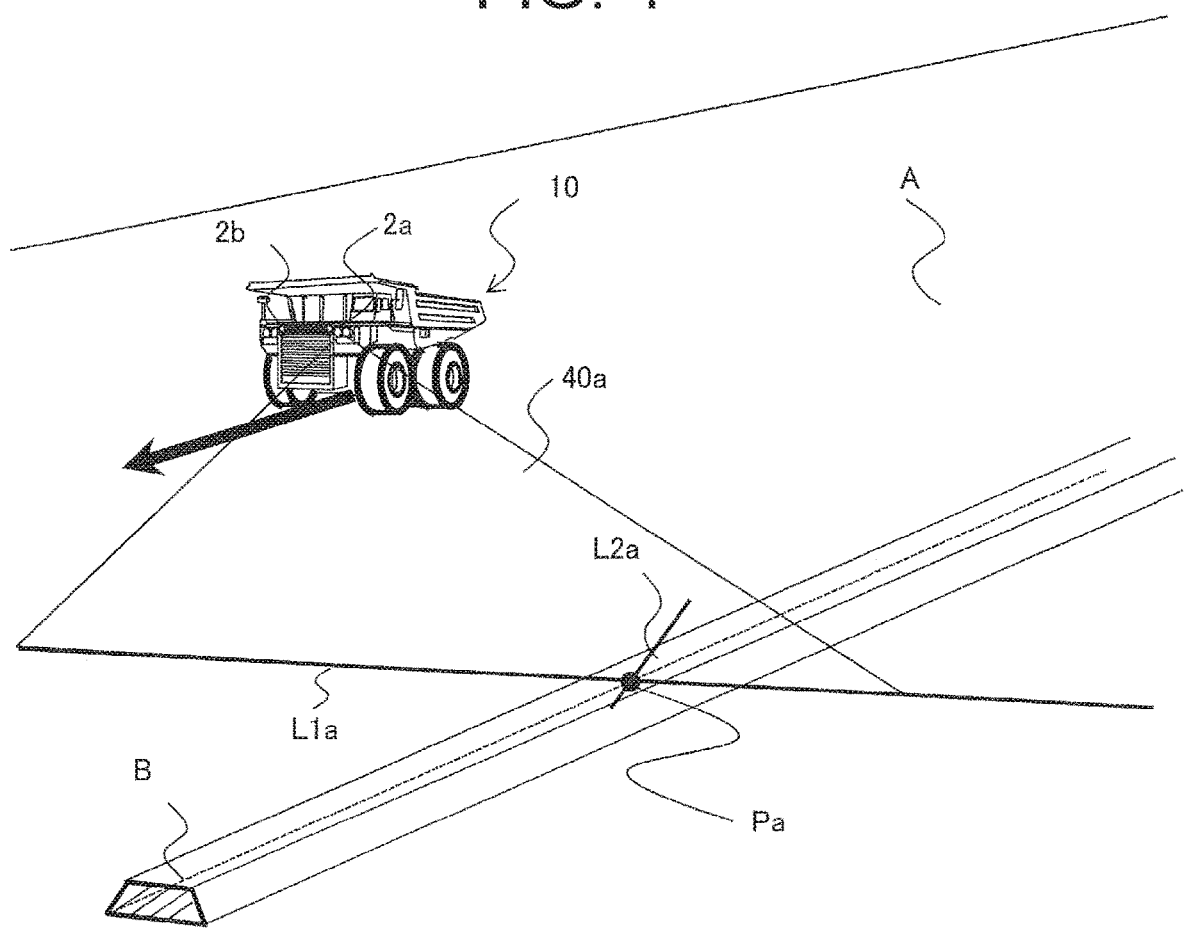
Figure 4:
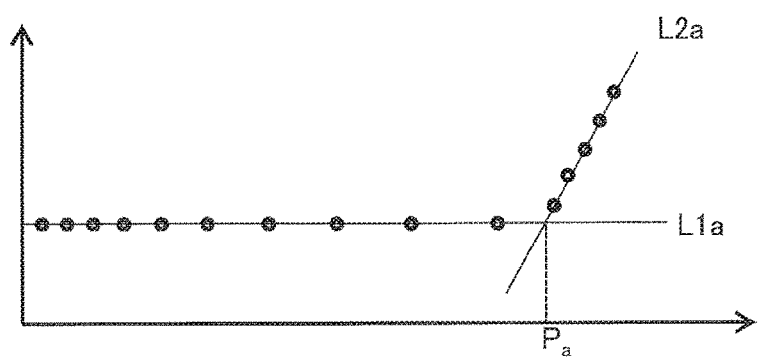

FIG. 4 is an explanatory diagram illustrating the travel environment of the dump truck 10 and example detection of feature points of the surrounding structure, in which (a) illustrates the travel environment and (b) illustrates example processing to detect a feature point from the output from the front lidar 2*a*.

As shown in FIG. 4(*a*), the dump truck 10 operates autonomously to travel on the road surface A such as of a pre-established travel route in a mine or the like. A shoulder B is constructed on a side portion of the road surface A of the mine to extend along the road surface A. The shoulder B is constructed at least on the side in the close vicinity of the dump truck 10 traveling along, e.g., on the left side in the travel direction, and the shoulder B is a mound having structure with a predetermined height dimension and a predetermined width dimension, which is located at a distance of, e.g., about 30 m from the travel position of the dump truck 10. In the present embodiment, the shoulder B is used as a surrounding structure located on the periphery of the travel route of the dump truck 10. And, of the shoulder B, a junction between the road surface A and the shoulder B is used as a feature point P of the surrounding structure.

The first shoulder detection section 181 calculates the first road-surface scanning line L1*a* and a first shoulder scanning line L2*a* which consists of a line connecting points of reflection from an inclined surface of the shoulder B facing the dump truck 10, i.e., an intersection line between a scanning surface 40*a* and the inclined surface.

The first shoulder detection section 181 further detects an intersection point between the first road-surface scanning line L1*a* and the first shoulder scanning line L2*a* as a shoulder feature point Pa consisting of the junction between the road surface A and the shoulder B (see FIG. 4(*b*)). It is noted that the shoulder feature point Pa referred to here is defined by a sensor coordinate system giving a relative position of the front lidar 2*a*.

The second shoulder detection section 183 performs processing similar to the foregoing on the basis of the output from the rear lidar 2*b*, and detects a shoulder feature point Pb (see FIG. 7) defined by a sensor coordinate system.

Figure 5:
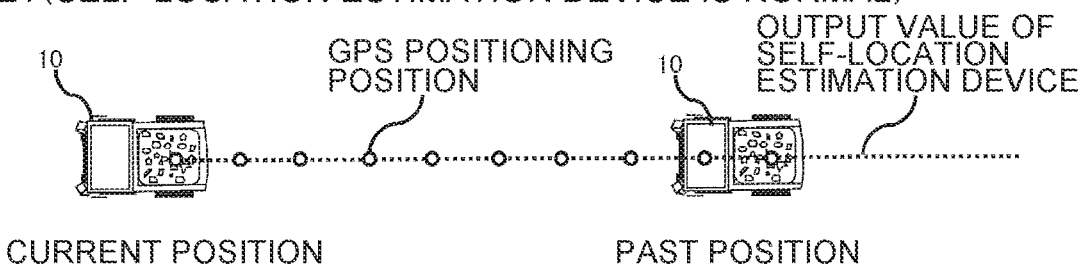
FIG. 5 is an explanatory diagram of anomaly detection processing of a self-location estimation device.
Figure 5:
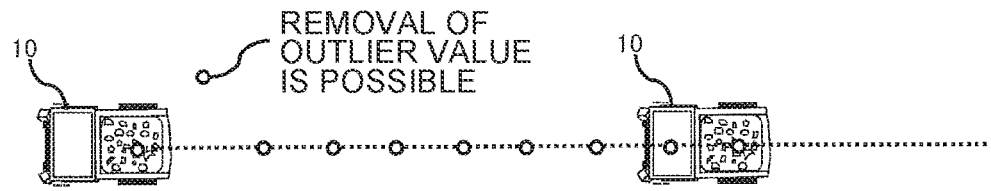
Figure 5:
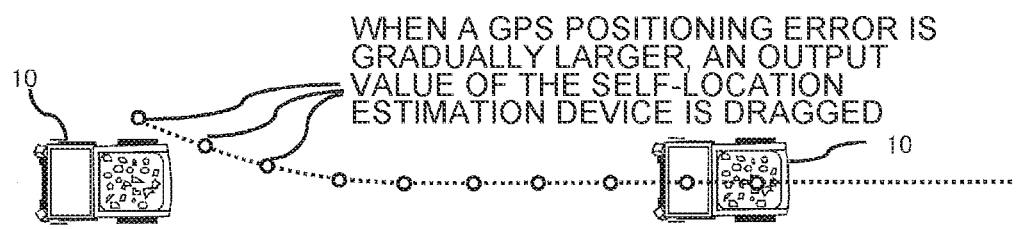

Reference is made to FIG. 5 to describe the overview of the anomaly detection processing for the self-location estimation device 11 according to the present embodiment. FIG. 5 is an explanatory diagram of the anomaly detection processing of the self-location estimation device 11.

When the dump truck 10 travels alongside a mountain wall or the like, a large error is likely to be included in the GPS positioning data due to influence of multipath. At this time, the self-location estimation device 11 compares an IMU-derived self-location and the GPS positioning position. Then, if the difference between them is small, the two sets of data are combined together (case 1), but if the difference is large, the GPS positioning position is not employed (case 2). This removes outlier values of the GPS positioning position unexpectedly produced by the influence of multipath.

Meanwhile, as in case 3 illustrated in FIG. 5, when the GPS positioning error is gradually larger and the deviation between the GPS positioning position and an estimated position obtained through odometry is less than a threshold, this results in the self-location estimation device 11 performing compensation based on the GPS positioning position including the error, which in turn may lead to a larger error from a true value of the self-location to be output from the self-location estimation device 11. A feature of the embodiment is successful detection of anomaly in the self-location estimation device 11 even in such case 3.

Figure 6:
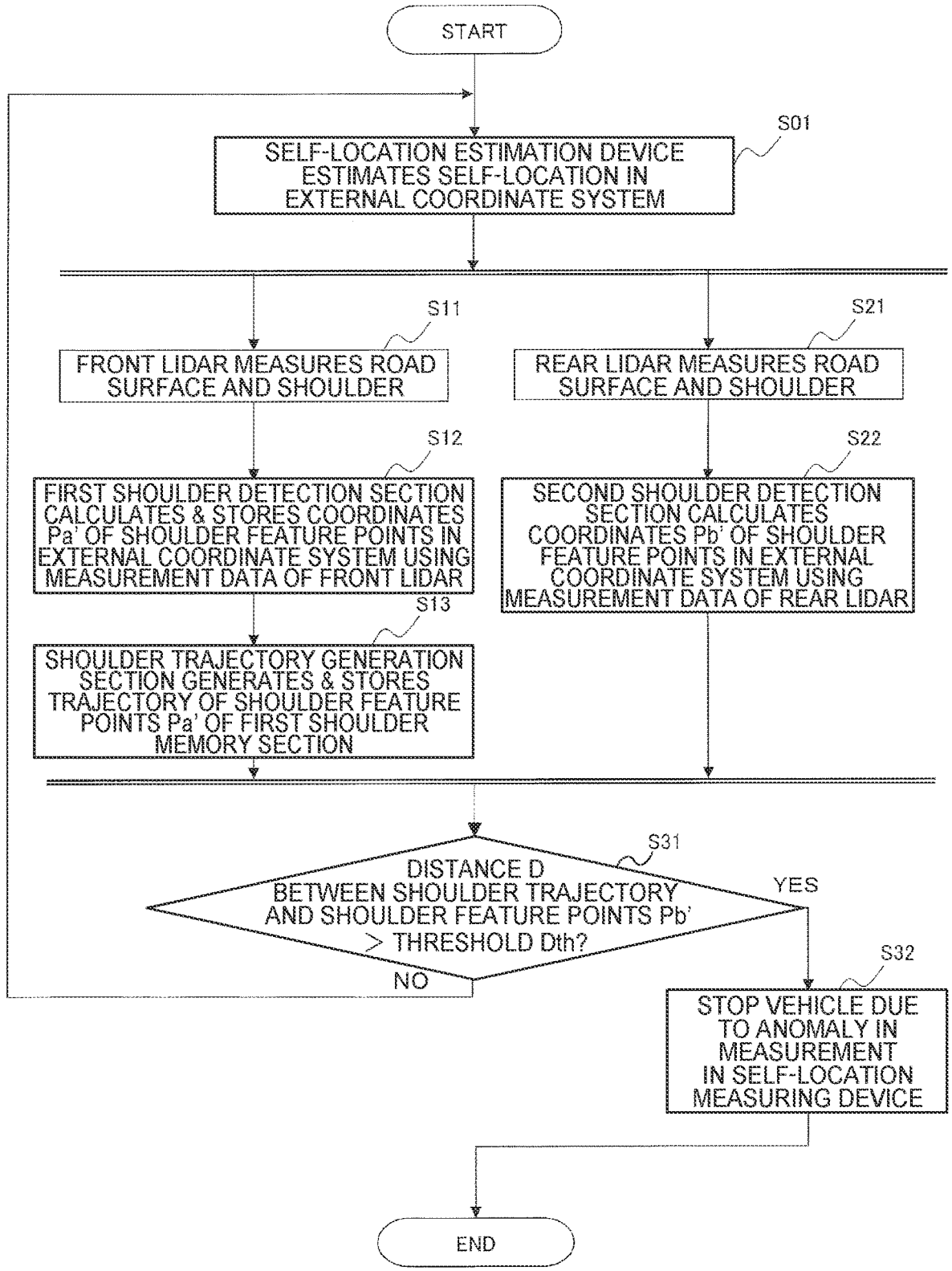
FIG. 6 is a flowchart illustrating the flow of operation of the anomaly detector.

The anomaly detection processing using the anomaly detector 18 of the self-location estimation device 11 according to the embodiment is described with reference to FIG. 6. FIG. 6 is a flowchart illustrating the flow of the operation of the anomaly detector 18.

Upon start-up of the dump truck 10, the self-location estimation device 11 calculates a self-location based on the GPS positioning data received through the GPS antenna 14, and then uses the output from the IMU 15, the steering angle sensor 16 and the vehicle speed sensor 17 to compensate for the self-location, thereby calculating a self-location defined by the external coordinate system (S01).

The road surface A and the shoulder B are measured by the front lidar 2a of the dump truck 10, and the measurement data is output to the first shoulder detection section 181 (S11).

The first shoulder detection section 181 detects a shoulder feature point Pa on the basis of the measurement data by the front lidar 2a. The first shoulder detection section 181 further detects a distance to the shoulder feature point Pa on the basis of the measurement data by the front lidar 2a, and uses the self-location (the external coordinate system) based on the GPS positioning data calculated in Step 01 to convert the coordinate values of the shoulder feature point Pa in the sensor coordinate system into the coordinate values in the external coordinate system (corresponding to a shoulder feature point Pa', first coordinates) according to the following formula (1). Thus, the first shoulder detection section 181 corresponds to a first feature-point coordinate calculation section.

The first shoulder detection section 181 stores the coordinates of the shoulder feature point Pa' in the first shoulder memory section 185 (S12).

(Coordinates of the shoulder feature point Pa' in the external coordinate system)=(the coordinate conversion matrix from the sensor coordinate system of the front lidar 2a to the vehicle-centered coordinate system) (a coordinate vector of the shoulder feature point Pa based on the sensor coordinate system of the front lidar 2a)+(a deviation from the installation position of the front lidar 2a in the vehicle frame in the vehicle-centered coordinate system to the position of the reference point of the self-location estimation device 11)+(a self-location defined by the external coordinate system calculated by the self-location estimation device 11)        (1)

Where the vehicle-centered coordinate system: a three-axis orthogonal system consisting of a vehicle front-rear axis, a left-right axis in the vehicle width direction perpendicular to the front-rear axis, and a vertical axis perpendicular to the front-rear axis and the left-right axis in the right-hand coordinate system, and the sensor coordinate system of the front lidar 2a: an xa axis as a radar illumination angle, a ya axis orthogonal to the xa axis on a radar scanning surface, and a za axis perpendicular to the xa axis and the ya axis in the right-hand coordinate system.

For convenience of clear description, assume that the reference point of the self-location estimation device 11 coincides with the origin of the vehicle-centered coordinate system. If the reference point of the self-location estimation device 11 does not coincide with the origin of the vehicle-centered coordinate system, the deviation is further added to or subtracted from the foregoing formula (1).

The shoulder trajectory generation section 182 reads the shoulder feature points Pa' stored in the first shoulder memory section 185, and arranges the shoulder feature points Pa' in a time sequence of measurements of the first coordinates of the shoulder feature points Pa' to generate a trajectory of the first coordinates, and the shoulder trajectory generation section 182 stores the trajectory in the shoulder trajectory memory section (S13). The trajectory represents a point sequence of the shoulder feature points Pa' defined by the external coordinate system.

Where the sampling rate of the front lidar 2a <the GPS sampling rate, the coordinates of the shoulder feature points Pa' are coordinates of points detected at time intervals corresponding to at least the GPS sampling rate or higher. Accordingly, the shoulder trajectory generation section 182 reads a point group of the shoulder feature points Pa' in a time sequence, and performs, for example, spline interpolations between the points to obtain a trajectory of the shoulder feature points Pa' defined by the absolute coordinate system.

Figure 7:
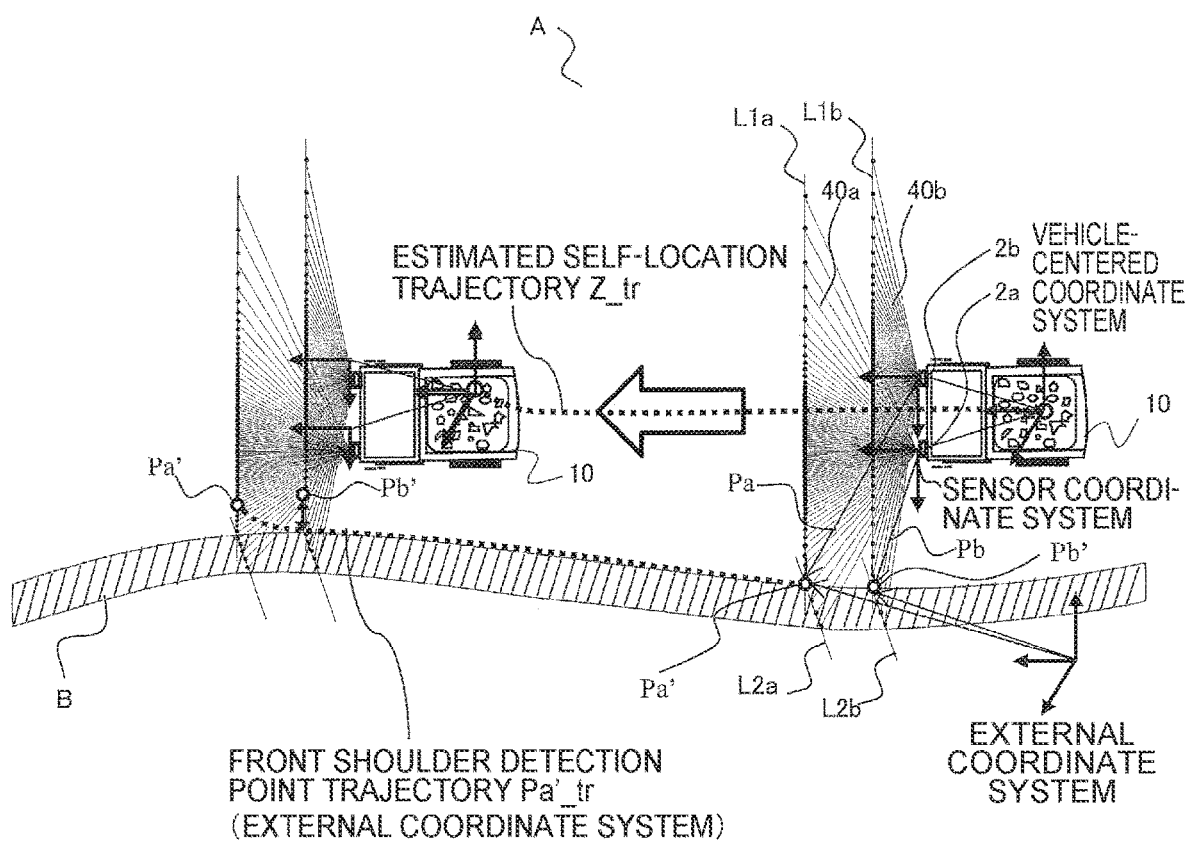
FIG. 7 is an explanatory diagram illustrating an example calculation of a trajectory of shoulder feature points Pa'.

FIG. 7 is an explanatory diagram illustrating an example calculation of a trajectory of the shoulder feature points Pa'. While the dump truck 10 is traveling in the travel direction (from right to left in FIG. 7), the self-location estimation device 11 is operated to estimate self-locations. A trajectory of the self-locations is indicated with reference sign Z_tr. Because the shoulder feature point Pa' results from the addition of the above self-location to the absolute positions of the dump truck 10 and the shoulder feature point Pa, the shape of the trajectory Pa'_tr of the shoulder feature points Pa' and the shape of reference sign Z_tr indicating the trajectory of the self-locations are similar to each other.

The rear lidar 2b measures the road surface and the shoulder in parallel with Step 11 to Step 13 (S21).

The second shoulder detection section 183 detects a shoulder feature point Pb on the basis of the measurement data by the rear lidar 2b, and then uses the self-location (the external coordinate system) based on the GPS positioning data calculated in Step 01 to calculate a location of the shoulder feature point Pb in the external coordinate system according to the following formula (1) (S22).

(Location of the shoulder B in the external coordinate system)=(a measurement result based on the sensor coordinate system of the rear lidar 2b)×(a coordinate conversion matrix from the sensor coordinate system of the rear lidar 2b to the vehicle-centered coordinate system)+(a deviation from the installation position of the rear lidar 2b in the vehicle frame to the reference point of the calculation position of own vehicle defined by the external coordinate system derived from GPS)+(a self-location defined by the external coordinate system derived from GPS)        (2)

Where the sensor coordinate system of the rear lidar 2b: an xb axis as a radar illumination angle, a yb axis orthogonal to the xb axis on a radar scanning surface, and a zb axis perpendicular to the xb axis and the yb axis in the right-hand coordinate system.

Noted that, similarly to Formula (1), assume that the reference point of the self-location estimation position coincides with the origin of the vehicle-centered coordinate system.

The second shoulder detection section 183 converts the coordinates of the shoulder feature point Pb which is measured by the rear lidar 2b and defined by the sensor coordinate system of the rear lidar 2b, into the absolute coordinate system in order to calculate a shoulder feature point Pb' (second coordinates). Because of this, the second shoulder detection section 183 corresponds to a second feature-point coordinate calculation section.

In FIG. 7, the shoulder feature point Pb' is also converted into the absolute coordinate system by use of the self-location. Because of this, if the self-location is normally estimated, the shoulder feature point Pb' should be located on the trajectory Pa'_tr of the shoulder feature point Pa'. Accordingly, this is verified in the next Step.

The anomaly determination section 184 performs a comparison between the trajectory Pa'_tr of the shoulder feature point Pa' and the shoulder feature point Pb', and then if it is determined that a deviation D between them (see FIG. 8) exceeds a threshold $D_{th}$ (S31/Yes), the anomaly determination section 184 determines that anomaly has occurred in the self-location estimation device 11, and outputs a stop control instruction signal to the vehicle control device 12 to cause the vehicle control device 12 to operate stopping the dump truck 10 (S32). The threshold $D_{th}$ is a threshold defined by the amount of offset of coordinates or distance for determination that the shoulder feature point Pb' is on the trajectory Pa'_tr of the shoulder feature points Pa'. The vehicle control device 12 controls the braking device and the drive torque limiter, which are not shown, to stop the dump truck 10. Conceivable factors in anomaly in the self-location estimation device 11 are influence of multipath on the GPS positioning data, failure of the IMU 15, the steering angle sensor 16 or the vehicle speed sensor 17, and the like.

If the anomaly determination section 184 determines that the deviation between the trajectory of the shoulder feature points Pa and the shoulder feature point Pb is equal to or below the threshold $D_{th}$ (S31/No), the anomaly determination section 184 determines that the self-location estimation device 11 operates normally, and returns to Step S01.

Figure 8:
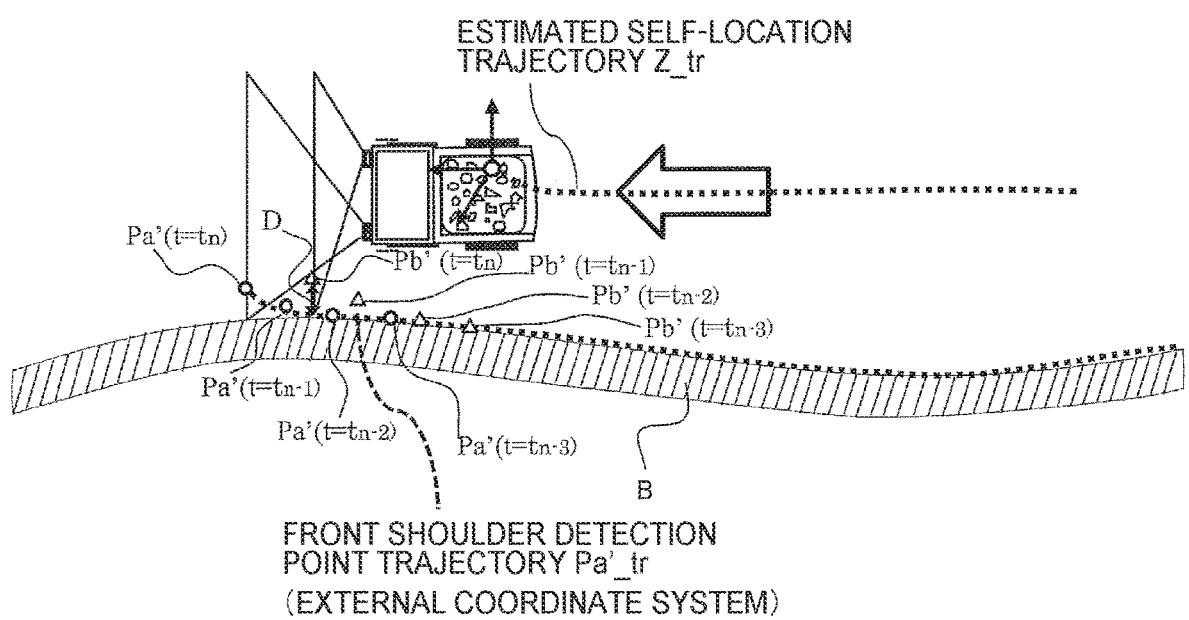
FIG. 8 is an explanatory diagram illustrating processing of comparison between a trajectory of shoulder feature points Pa' and shoulder feature points Pb'.

Reference is made to FIG. 8 to describe the processing of comparison between the trajectory Pa'_tr of the shoulder feature points Pa' and the shoulder feature point Pb'. FIG. 8 is an explanatory diagram illustrating the processing of comparison between the trajectory Pa'_tr of the shoulder feature points Pa' and the shoulder feature point Pb'.

The shoulder feature point Pa' at time $t_{n-3}$ ($t=t_{n-3}$) (shown by the circle in FIG. 8) is located anterior to the rear shoulder feature point Pb' at the same time ($t=t_{n-3}$) (shown by the triangle in FIG. 8). Because the self-location estimation device 11 operates normally at time $t_{n-3}$ and time $t_{n-2}$, the rear shoulder feature points Pb'($t=t_{n-3}$) and Pb'($t=t_{n-2}$) are located on the trajectory connecting the shoulder feature point Pa'($t=t_{n-3}$) and the shoulder feature point Pa'($t=t_{n-2}$).

However, if anomaly (offset from a true value) occurs in the self-location information output at time $t_{n-1}$ from the self-location estimation device 11, the second shoulder detection section 183 uses the self-location including the offset from the true value at time $t_{n-1}$ to calculate a rear shoulder feature point Pb'. That is, in the last term of the aforementioned formula (2), the self-location including the offset from the true value is used for conversion from the sensor coordinate system to the absolute coordinate system.

Here, a feature point on the trajectory Pa'_tr of the shoulder feature points Pa' compared with the shoulder feature point Pb'($t=t_{n-1}$) is measured at a time previous to the time at which the shoulder feature point Pb' is measured ($t=t_{n-1}$). Given that the self-location information is correct at the previous time, a positional offset equivalent to the degree of anomaly in the self-location at the measurement time ($t=t_{n-1}$) can be observed as a deviation from the trajectory Pa'_tr of the shoulder feature point Pb'($t=t_{n-1}$).

For the front shoulder feature point Pa'($t=t_{n-1}$) after the conversion of the front shoulder feature point Pa($t=t_{n-1}$) by the front lidar 2a into the absolute coordinate system, a positional offset similar to the above can be observed.

To address this, the anomaly determination section 184 obtains a deviation D from the trajectory Pa'_tr of the shoulder feature point Pb'($t=t_n$). Then, when the deviation D exceeds the above-described threshold $D_{th}$, the anomaly determination section 184 determines that anomaly occurs in the self-location estimation device 11.

According to the present embodiment, a feature point of a surrounding structure is detected by the front lidar and feature-point coordinates defined by the sensor coordinate system are calculated. Then, the coordinate conversion into the absolute coordinate system is performed on the feature-point coordinates by use of the self-location calculated with the absolute coordinate system, and thereby a trajectory is generated. Then, the trajectory is used as a teaching coordinate series to be compared with the feature-point coordinates detected by the rear lidar. As a result, if the deviation is large (as long as the deviation is inappropriate for being deemed to be correct), it is revealed that anomaly (offset from the true value) occurs in the self-location which has been used in the conversion of the feature point detected by the rear lidar into the absolute coordinate system. Thereby, even if the shape of a surrounding structure around the travel route is not measured in advance, the measure points of the front lidar obtained during traveling can be used to detect occurrence of anomaly in the self-location estimation device. That is, according to the present embodiment, because the coordinates of a feature point calculated at a certain time point using Formula (2) are compared with the coordinates (properly speaking, the trajectory) of the feature points calculated at a slightly earlier time point using Formula (1), this follows that the comparison is performed at a time point slightly before the error becomes embedded in the GPS positioning data, which in turn enables the determination of the presence or absence of an error even in the above-described case 3 in FIG. 5.

Second Embodiment

Figure 9:
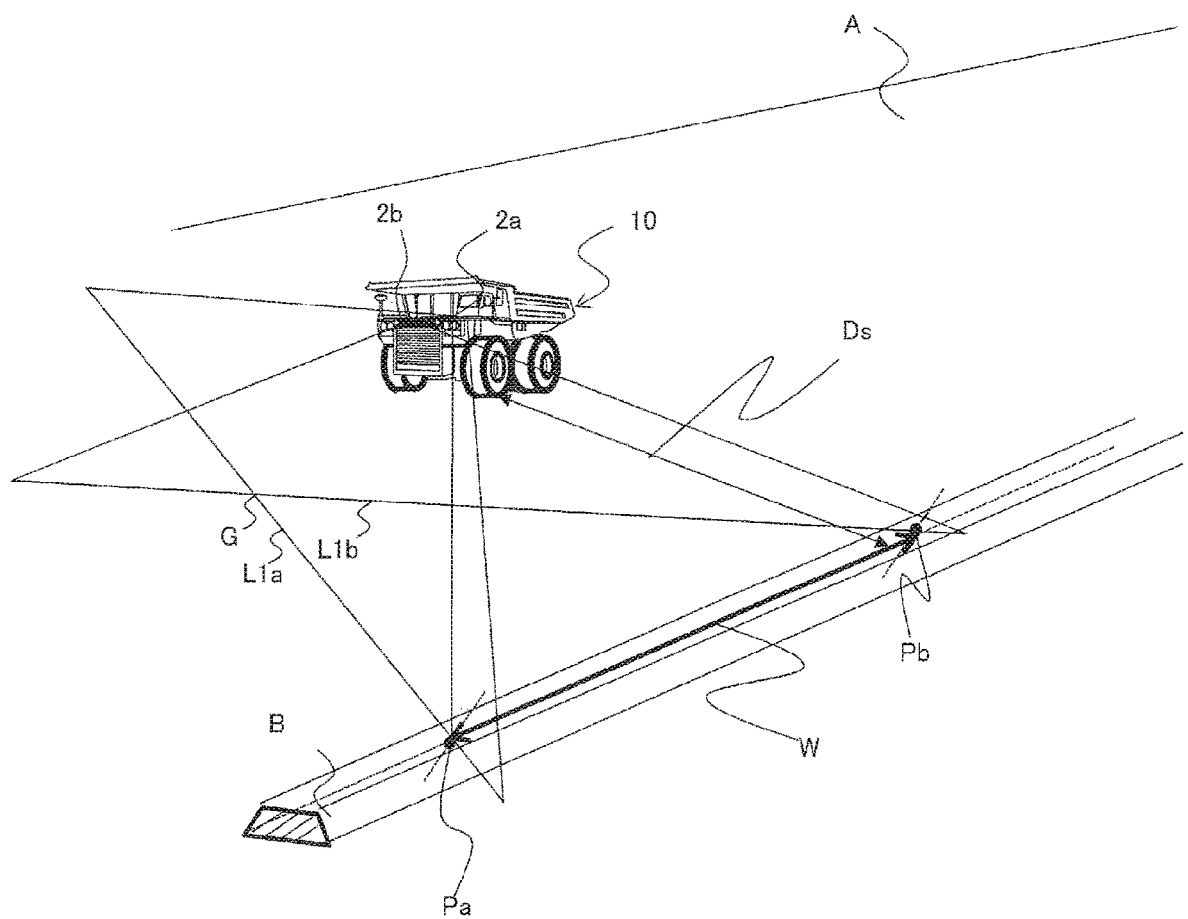
FIG. 9 is a perspective schematic view illustrating scanning surfaces of a front lidar 2a and a rear lidar 2b according to a second embodiment.
Figure 10:
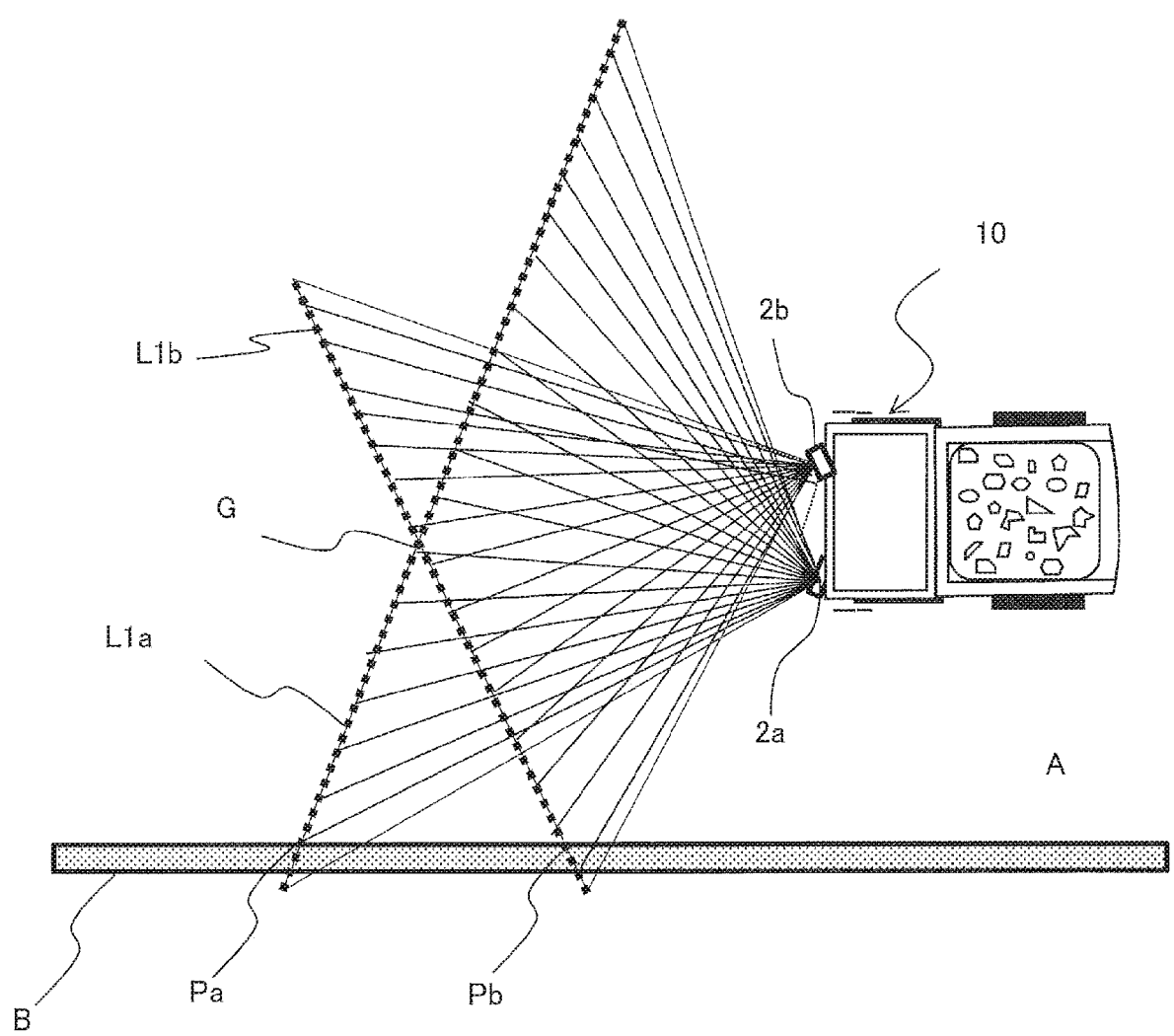
FIG. 10 is a schematic top view illustrating the scanning surfaces of the front lidar 2a and the rear lidar 2b according to the second embodiment.

FIG. 9 is a perspective schematic view illustrating the scanning surfaces of both of a front lidar 2a and a rear lidar 2b according to a second embodiment. FIG. 10 is a schematic top view illustrating the scanning surfaces of both of the front lidar 2a and the rear lidar 2b according to the second embodiment.

Regarding a point of difference of the second embodiment from the first embodiment, in the first embodiment, the front and rear lidars 2a, 2b are placed in the dump truck 10 such that the first road-surface scanning line L1a of the front lidar 2a and the second road-surface scanning line L1b of the rear lidar 2b are parallel to each other. In contrast to this, in the second embodiment, the front lidar 2a and the rear lidar 2b are installed to the dump truck 10 such that the first road-surface scanning line L1a and the second road-surface scanning line L1b cross each other in front of the vehicle and also within vehicle-width limits. Incidentally, in the second embodiment, portions the same as, similar to or corresponding to those in the first embodiment are indicated by the same reference signs.

In the second embodiment, the first road-surface scanning line L1a and the second road-surface scanning line L1b are provided to cross each other at a cross point G in front of the vehicle. As a result, as illustrated in FIG. 9, as the distance Ds between the dump truck 10 and the shoulder B increases, the distance W between the shoulder feature point Pa and the shoulder feature point Pb increases.

In general, the travel speed is set to be lower if required to travel on a narrow road in proximity to a shoulder provided for protection from slipping down a steep slope.

Meanwhile, the travel speed is set to be higher if it is possible to travel at a distance from a shoulder on a wide road.

Here, in the first embodiment, the higher the vehicle speed, the shorter the time intervals at which the front lidar 2a and the rear lidar 2b measure the shoulder. Because of this, effects similar to those when the threshold value $D_{th}$ is set to be relatively high are produced. As a result, as the travel speed increases, the anomaly detection sensitivity of the self-location estimation device 11 decreases. Conversely, at low travel speeds, the anomaly detection sensitivity of the self-location estimation device 11 becomes excessively high, so that there is a possibility of making more often than necessary a determination of occurrence of anomaly.

However, in the second embodiment, as the vehicle increases distance from the shoulder, the distance W between the shoulder feature point Pa and the shoulder feature point Pb increases. This makes it possible to prevent a reduction in the anomaly detection sensitivity of the self-location estimation device 11 at high travel speeds.

According to the second embodiment, further, changing the laser illumination angles of the front lidar 2a and the rear lidar 2b with travel speed enables the front lidar 2a and the rear lidar 2b to measure shoulder feature points at regular time intervals without regard to travel speeds. Specifically, the cross point G is controlled to be located closer to the dump truck 10 at low travel speeds, and, the laser illumination angle of each lidar with respect to the road surface is controlled to be smaller as the travel speed is higher so that the cross point G is located farther from the dump truck 10. Thereby, the anomaly detection of the self-location estimation device 11 is able to be performed at regular time intervals.

The present invention is not limited to each of the above-described embodiments, and various modified forms without departing from the scope and sprit of the present invention fall within the technical scope of the present invention.

For example, in the above-described Step S32, instead of or along with the vehicle stop control, the anomaly detection result of the self-location estimation device 11 may be transmitted via the communication device 13 to the operation control server 20. The operation control server 20 may retain the history of receiving the anomaly detection results in memory. Then, if an anomaly detection result has been received from another dump truck 10 in the same or nearby section on the haul road 60, it can be estimated that the occurrence of anomaly is caused by multipath of the GPS positioning data, rather than the self-location estimation device 11 of each dump truck 10 and the sensors installed in the vehicle. In this case, using the GPS-derived self-location as an outlier value in the section in question and performing self-location estimation with the output value of the IMU enables avoidance of the control of stopping the dump truck 10 from the subsequent times.

In the above description, the front lidar 2a and the rear lidar 2b are a plurality of separately structured sensors, but the first measuring device for measuring the shoulder and the second measuring device for measuring the same place following the first measuring device may be configured as a single sensor using a multilayer laser scanner, a stereo camera, or the like.

REFERENCE SIGNS LIST

1 . . . Autonomous travel system
2a . . . Front lidar
2b . . . Rear lidar
10 . . . Dump truck
11 . . . Self-location estimation device
18 . . . Anomaly detector

The invention claimed is:

1. An anomaly detector for a self-location estimation device that is installed in a vehicle and estimates a self-location defined by an absolute coordinate system, the anomaly detector comprising:
   a first feature-point coordinate calculation section that,
      based on output from a first measuring device that measures a location of its own vehicle relative to each feature point in a feature point group on a surrounding structure around a road surface on which the vehicle travels, the feature point group being lined along a travel direction,
      acquires coordinates of the each feature point expressed in a coordinate system of the first measuring device, and
      uses the self-location to convert the coordinates into an external coordinate system in order to calculate first coordinates;
   a feature-point trajectory generation section that generates, based on the first coordinates, a trajectory defined by the external coordinate system of the feature point group;
   a second feature-point coordinate calculation section that,
      based on output from a second measuring device that measures a location of its own vehicle relative to each feature point in the feature point group of the surrounding structure, the feature point being located, in the travel direction, rearward of the feature point measured by the first measuring device, at a measurement time of the first measuring device,
      acquires coordinates of the feature point located rearward in the travel direction, the coordinates being expressed in a coordinate system of the second measuring device, and
      uses the self-location to convert the coordinates into an external coordinate system in order to calculate second coordinates; and
   an anomaly determination section that determines that anomaly occurs in the self-location estimation device if a deviation between the second coordinates and the trajectory of the feature point group defined by the external coordinate system exceeds a threshold established to deem that the second coordinates are on the trajectory.

2. The anomaly detector for the self-location estimation device according to claim 1,
   wherein the vehicle is a dump truck traveling in a mine, and
   the first measuring device and the second measuring device scan the road surface on which the dump truck travels, and a shoulder located sideways with respect to the travel direction of the dump truck, and measure each of measurement points of the road surface and the shoulder and a relative location of its own vehicle.

3. The anomaly detector for the self-location estimation device according to claim 2,
   wherein the first feature-point coordinate calculation section calculates the first coordinates by detecting, as a shoulder feature point, an intersection point of a first road-surface scanning line and a first shoulder scanning line on the basis of output from the first measuring device, the first road-surface scanning line serving as an intersection line of a scanning surface of the first measuring device and the road surface, the first shoulder scanning line serving as an intersection line of a scanning surface of the first measuring device and an inclined surface of the shoulder, and the second feature-point coordinate calculation section calculates the second coordinates by detecting, as a shoulder feature point, an intersection point of a second road-surface scanning line and a second shoulder scanning line on the basis of output from the second measuring device, the second road-surface scanning line serving as an intersection line of a scanning surface of the second measuring device and the road surface, the second shoulder scanning line serving as an intersection line of a scanning surface of the second measuring device and an inclined surface of the shoulder.

4. The anomaly detector for the self-location estimation device according to claim 2, wherein the first measuring device and the second measuring device are installed in the front of the dump truck, and are installed at installation angles and positions to cause an intersection point between a first road-surface scanning line which serves as an intersection line of a scanning surface of the first measuring device and the road surface, and a second road-surface scanning line which serves as an intersection line of a scanning surface of the second measuring device and the road surface, to fall within a range in front of the dump truck and of a vehicle-width of the dump truck.

5. The anomaly detector for the self-location estimation device according to claim 1, wherein the first measuring device and the second measuring device are installed in the front of the vehicle, and are installed at installation angles and positions to cause a scanning surface of the second measuring device to be situated rearward of a scanning surface of the first measuring device, and also to cause the scanning surface of the first measuring device and the scanning surface of the second measuring device to be parallel to each other.

6. The anomaly detector for the self-location estimation device according to claim 1, wherein the first measuring device is installed in an orientation that causes a scanning surface of the first measuring device to be directed forward in the travel direction of the vehicle, and the second measuring device is installed in an orientation that causes a scanning surface of the second measuring device to be directed rearward in the travel direction of the vehicle.

7. A vehicle equipped with an anomaly detector for a self-location estimation device, comprising:

a first measuring device that measures a location of its own vehicle relative to each feature point in a feature point group on a surrounding structure around a road surface on which the vehicle travels, the feature point group being lined along a travel direction;

a second measuring device that measures a location of its own vehicle relative to a feature point in the feature point group of the surrounding structure, the feature point being located, in the travel direction, rearward of the feature point measured by the first measuring device, at a measurement time of the first measuring device;

a self-location estimation device that estimates a self-location defined by an external coordinate system; and an anomaly detector that detects anomaly in the self-location estimation device, wherein the anomaly detector includes a first feature-point coordinate calculation section that acquires coordinates of the each feature point expressed in a coordinate system of the first measuring device, based on output from the first measuring device, and uses the self-location to convert the coordinates into an external coordinate system in order to calculate first coordinates, a feature-point trajectory generation section that generates, based on the first coordinates, a trajectory defined by the external coordinate system of the feature point group, a second feature-point coordinate calculation section that, based on output from the second measuring device, acquires coordinates of the feature point located rearward in the travel direction, the coordinates being expressed in a coordinate system of the second measuring device, and uses the self-location to convert the coordinates into an external coordinate system in order to calculate second coordinates, and an anomaly determination section that determines that anomaly occurs in the self-location estimation device if a deviation between the second coordinates and the trajectory of the feature point group defined by the external coordinate system exceeds a threshold established to deem that the second coordinates are on the trajectory.

* * * * *